(12) United States Patent
Park et al.

(10) Patent No.: US 6,200,496 B1
(45) Date of Patent: Mar. 13, 2001

(54) LOW-VOLTAGE EXCITED WHITE PHOSPHOR

(75) Inventors: Hyung-Keun Park, Kyungsangnam-do; Sung-Kyoo Park, Pusan-si, both of (KR)

(73) Assignee: Samsung Display Devices Co., Ltd., Suwon (KR)

( * ) Notice: Subject to any disclaimer, the term of this patent is extended or adjusted under 35 U.S.C. 154(b) by 0 days.

(21) Appl. No.: 09/414,389

(22) Filed: Oct. 7, 1999

(30) Foreign Application Priority Data

May 11, 1999 (KR) .................................................. 99-16813

(51) Int. Cl.[7] .................................................. C09K 11/54

(52) U.S. Cl. ........................................................ 252/301.6 S
(58) Field of Search ....................................... 252/301.6 S

(56) References Cited

U.S. PATENT DOCUMENTS

| | | | | |
|---|---|---|---|---|
| 3,031,416 | * | 4/1962 | Morrison et al. | 252/301.6 S |
| 3,922,233 | * | 11/1975 | Torii et al. | 252/301.6 S |

* cited by examiner

*Primary Examiner*—C. Melissa Koslow
(74) *Attorney, Agent, or Firm*—Christie, Parker & Hale, LLP

(57) ABSTRACT

A low-voltage excited white phosphor is provided. The white phosphor includes a ZnS:Zn phosphor and a $(Zn_n Cd_{1-n})S:Ag,Cl$ phosphor (n=0.5 to 0.7), and has good color purity, high brightness and excellent color maintenance.

7 Claims, 4 Drawing Sheets

LOW-VOLTAGE EXCITED WHITE PHOSPHOR

CROSS REFERENCE TO RELATED APPLICATION

This application is based on application No. 99-16813 filed in the Korea Industrial Property Office on May 11, 1999, the content of which is incorporated hirein by reference.

FIELD OF THE INVENTION

The present invention relates to a low-voltage excited white phosphor, and more particularly, to a low-voltage excited white phosphor with high brightness and excellent color maintenance.

BACKGROUND OF THE INVENTION

Low-voltage driven display devices utilizing a voltage of IkV or less to excite phosphor material include FEDs (field emission displays), VFDs (vacuum fluorescent displays), etc. FEDs utilize well-established cathode-anode-phosphor technology in combination with dot matrix cellular construction of each pixel. VFDs also utilize cathode-anode-phosphor technology; electrons are emitted from a filament, and controlled by a grid electrode and an anode electrode to collide with phosphor material on the anode to excite the phosphor material. Generally, a CRT (cathode ray tube) produces various color images by mixing red, green and blue lights emitted from red, green and blue phosphors, respectively. It is difficult for VFDs or FEDs to radiate various colors by mixing red, green and blue lights because VFDs and FEDs generally only use one color phosphor. To obtain a white color in a VFD or FED, a red filter is generally mounted on a green phosphor. The white ray obtained by such a method does not have enough brightness and its color is not clear. The requirement of an additional filter also results in an increase in the production cost. Thus, with the ever-increasing demand for various color phosphors, there is a need to develop a white phosphor self-emitting a white ray.

SUMMARY OF THE INVENTION

It is an object of the present invention to provide a low-voltage excited white phosphor having good color purity.

It is another object of the present invention to provide a low-voltage excited white phosphor with high brightness and excellent color maintenance.

It is yet another object of the present invention to provide a low-voltage excited white phosphor which emits white colored rays without using an additional filter.

In order to achieve these and other objects, the present invention provides a low-voltage excited white phosphor including a ZnS:Zn phosphor; and a $(Zn_nCd_{1-n})S:Ag,Cl$ phosphor (n=0.5 to 0.7).

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE INVENTION

Figure 1:
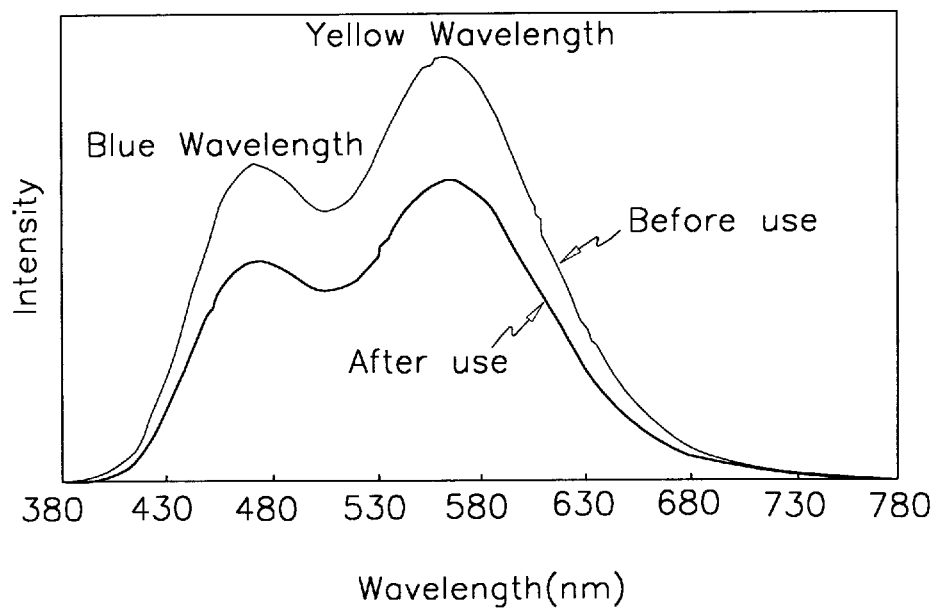
FIG. 1 is a graph showing wavelength spectrums of a white phosphor according to an embodiment of the present invention.

For a better understanding of the present invention, reference will now be made in detail to the following disclosures.

The white phosphor according to an embodiment of the present invention includes a ZnS:Zn phosphor and a $(Zn_nCd_{1-n})S:Ag,Cl$ phosphor (n=0.5 to 0.7). The white phosphor is produced by mixing a blue phosphor with a greenish yellow or yellow phosphor, using a ZnS:Zn phosphor as the blue phosphor and using a (ZnCd)S:Ag,Cl phosphor as the yellow phosphor.

The color of the (ZnCd)S:Ag,Cl phosphor depends on the composition of Zn and Cd. For obtaining the white phosphor of the present invention, a (ZnCd)S:Ag,Cl phosphor having 50–70 mol % of Zn and 30–50 mol % of Cd is preferably used. Namely, the phosphor is expressed by the formula $(Zn_nCd_{1-n})S:Ag,Cl$, where n is in the range of 0.5 to 0.7. If n is not within this range, the resulting phosphor emits a different color from the intended white color.

By mixing the ZnS:Zn blue phosphor and the $(Zn_nCd_{1-n})S:Ag,Cl$ yellow phosphor (n=0.5 to 0.7), the resulting phosphor emits a white color in a CIE chromaticity diagram. The wavelength spectrum of the resulting phosphor actually shows two peaks, one being a blue and one being a yellow wavelength, but a user cannot differentiate the separate colors but rather sees only the mixed white color.

The ZnS:Zn phosphor has good light emitting efficiency and high brightness. The (ZnCd)S:Ag,Cl phosphor has good conductivity and low threshold voltage, but has a drawback in that brightness saturation phenomena frequently occur on the phosphor. Therefore, the white phosphor, produced by properly mixing the two phosphors, has high brightness and good light emitting efficiency, and emits a visible ray with relatively low driving voltage and without brightness saturation. In the present invention, the mixing ratio of the ZnS:Zn phosphor: the $(Zn_nCd_{1-n})S:Ag,Cl$ phosphor (n=0.5 to 7) is preferably 20:80 to 80:20 by weight, and more preferably 50:50. If the ratio of the $ZnS:Zn/(Zn_nCd_{1-n})S:Ag,Cl$ is greater than 8/2, the color of the resulting phosphor shifts to blue color, and if the ratio of the $ZnS:Zn/(Zn_nCd_{1-n})S:Ag,Cl$ is less than 2/8, the color of the resulting phosphor shifts to a yellow color.

The white phosphor of the present invention may further include metal additives to increase luminous efficiency, brightness and color maintenance thereof. The preferable metal additive includes Zn, and Zn is added to the phosphor in the form of minuscule particles having diameters of 0.1 to 100 micrometers. Preferably, a Zn particle has a diameter of 0.1 to 10 μm and at least 95% purity.

The added Zn increases the luminous efficiency of the (ZnCd)S:Ag,Cl phosphor, thereby increasing a peak intensity corresponding to a yellow wavelength, changing the color of the phosphor from blue to yellow, and increasing the brightness of the phosphor.

The preferred amount of Zn is from 0.1 to 5.0 wt % based on the white phosphor. If the amount of Zn is less than 0.1 wt %, the brightness of the white phosphor does not increase, whereas if the amount of Zn is above 5.0 wt %, no additional advantage is realized.

The Zn particles in the phosphor react with oxygen during a baking step when producing the VFD, thereby oxidization of a host material in the phosphor can be prevented. Furthermore, Zn is diffused on a surface of the phosphor, lowering the surface charge of the phosphor such that an incidence efficiency of hot electrons is enhanced. Accordingly, the brightness of the white phosphor increases by 20 to 100% according to the amount of metal added to the phosphor, compared with the brightness of a white phosphor having no metal additives.

Meanwhile, the brightness of a conventional phosphor decreases as its surface temperature is raised. However, the white phosphor including metal additives has excellent heat resistance characteristics, and its brightness is minimally decreased with a temperature increase.

The white phosphor of the present invention has CIE color coordinates of x=0.20 to 0.45 and y=0.2 to 0.45. The presentive white phosphor including metal additives emits a soft white color of a pastel tone, generally referred to as paper white, rather than the typical white color. Another advantage of the white phosphor of the present invention is its color maintenance. Because the lifetimes of phosphor materials generally differ from each other, the color of a phosphor including two or more phosphors gradually changes with use. In contrast, in the white phosphor of the present invention, each phosphor component has a similar lifetime; thereby the white phosphor maintains its color during its full lifetime. The white phosphor including metal additives has more preferred color maintenance.

The present invention is further explained in more detail with reference to the following examples. However, the present invention is not confined to the following examples.

EXAMPLE 1

50 wt % of ZnS:Zn phosphor was mixed with 50 wt % of($Zn_{0.5}Cd_{0.5}$)S:Ag,Cl phosphor to produce a white phosphor.

EXAMPLE 2

50 wt % of ZnS:Zn phosphor and Zn additive were mixed with 50 wt % of ($Zn_{0.5}Cd_{0.5}$)S:Ag,Cl phosphor to produce a white phosphor. The amount of the Zn was 0.4 wt % of the mixture.

A VFD was manufactured with the white phosphor of Example 2, and a conventional VFD was manufactured in which a red filter was mounted on its green phosphor to radiate white color rays. While driving each VFD with a grid and anode voltage Ebc of 25Vp-p and a duty ratio of 1/9, the brightness was measured. The brightness of the phosphor of Example 2 was 172 ft-L (foot-lambert), while the brightness of the conventional green phosphor was 511 ft-L, and the brightness of the green phosphor with red filter was 51.1 ft-L. This shows that the filter greatly reduces the brightness of the white color ray to only 10% of the brightness of the green phosphor. In the present invention, no filter is required and the brightness of the white color ray is approximately three times the brightness of the white color ray produced by the conventional method.

The wavelength spectrums of the white color rays before and after driving the VFD of example 2 for 1800 hours were measured, and the results are shown in FIG. 1. As shown in FIG. 1, the white color ray of the present invention includes two peaks of blue and yellow wavelengths. The color quality of the resulting white color ray depends on the difference between the heights (intensities) of the blue and yellow peaks. If the blue peak is higher than the yellow peak, a bright white color results, while if the yellow peak is higher than the blue peak, a soft white color results. If the lifetime of the blue phosphor is different from that of the yellow phosphor, the quality of white color ray changes since the difference between the heights of the two peaks changes with the driving of the VFD. However, as shown in FIG. 1, the height difference between the blue and yellow peaks for the white phosphor of the present invention remains constant before and after use. This indicates that an identical white color is maintained during the entire lifetime of the white phosphor, because the blue and yellow phosphors have the same lifetimes.

EXAMPLE 3

55 wt % of ZnS:Znphosphor was mixed with 45 wt % of ($Zn_{0.5}Cd_{0.5}$)S:Ag,Cl phosphor to produce a white phosphor.

EXAMPLE 4

55 wt % of ZnS:Zn phosphor and Zn additive were mixed with 45 wt % of ($Zn_{0.5}Cd_{0.5}$)S:Ag Cl phosphor to produce a white phosphor. The amount of the Zn was 1.0 wt % of the mixture.

Two VFDs were manufactured with the white phosphors of Examples 3 and 4. While driving the VFDs with a filament voltage Ef of 3.5 Vac, an anode and grid voltage Ebc of 21 Vp-p, a duty ratio of 1/7, and a tp (pulse width) of 100/μs, the brightness, luminous efficiency, color coordinates and brightness relative to a conventional green phosphor were determined. The results are shown in Table 1. In Table 1, ft-L is a unit of brightness and indicates foot-lambert. The luminous efficiency indicates brightness per watt.

TABLE 1

| | Brightness [ft-L] | Luminous efficiency [Lm/w] | Color coordinates (x) × (y) | Brightness Relative to green phosphor |
|---|---|---|---|---|
| Example 3 | 53.1 | 2.63 | 0.289 × 0.342 | 20.2% |
| Example 4 | 74.4 | 3.40 | 0.318 × 0.382 | 28.3% |

The color coordinates in Table 1 shows that the phosphors of Examples 3 and 4 radiate white color.

Figure 2:
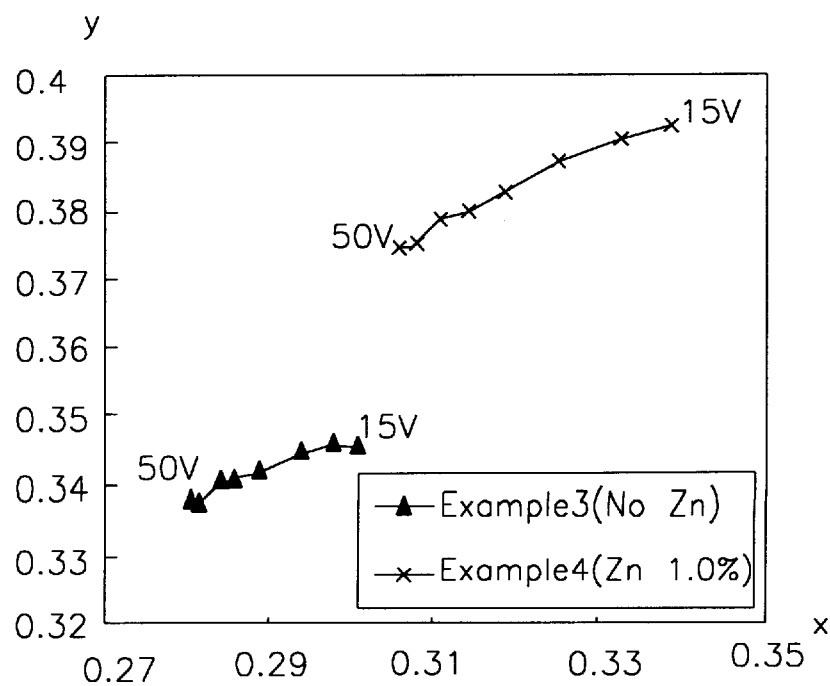
FIG. 2 is a color coordinate diagram of white phosphors according to embodiments of the present invention.
Figure 3:
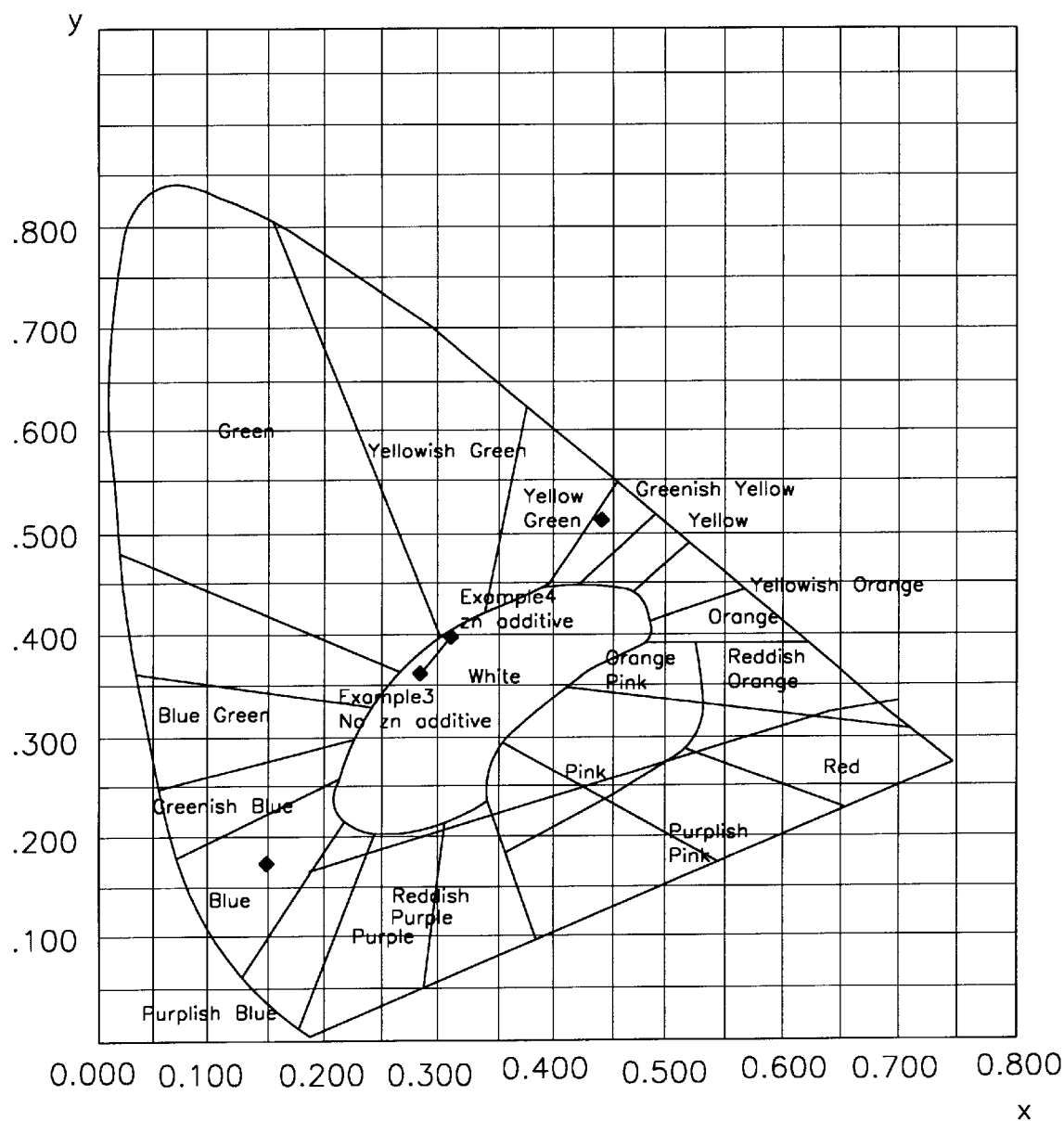
FIG. 3 is a CIE chromaticity diagram of yellow and blue phosphors and white phosphors according to embodiments of the present invention.

While changing the Ebc from 15V to 50V, the changes of the color coordinates were measured, and the results are shown in FIG. 2. As shown in FIG. 2, the phosphors of Examples 3 and 4 radiate white color rays with small changes in color coordinates. The CIE chromaticity coordinates of rays emitted from the white phosphors of Examples 3 and 4, and conventional yellow and blue phosphors are shown in FIG. 3.

Figure 4:
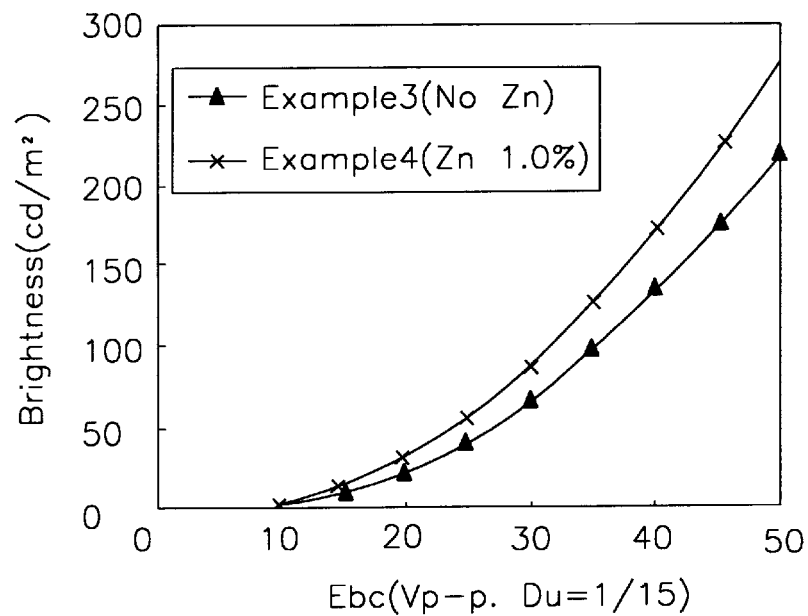
FIG. 4 is a graph showing brightness of white phosphors according to embodiments of the present invention.

FIG. 4 shows brightness changes of the white phosphor of Examples 3 and 4 according to the changes of Ebc at the duty ratio of 1/15. As shown in FIG. 4, the phosphor with Zn additive shows higher brightness than the phosphor with no Zn additive.

Figure 5:
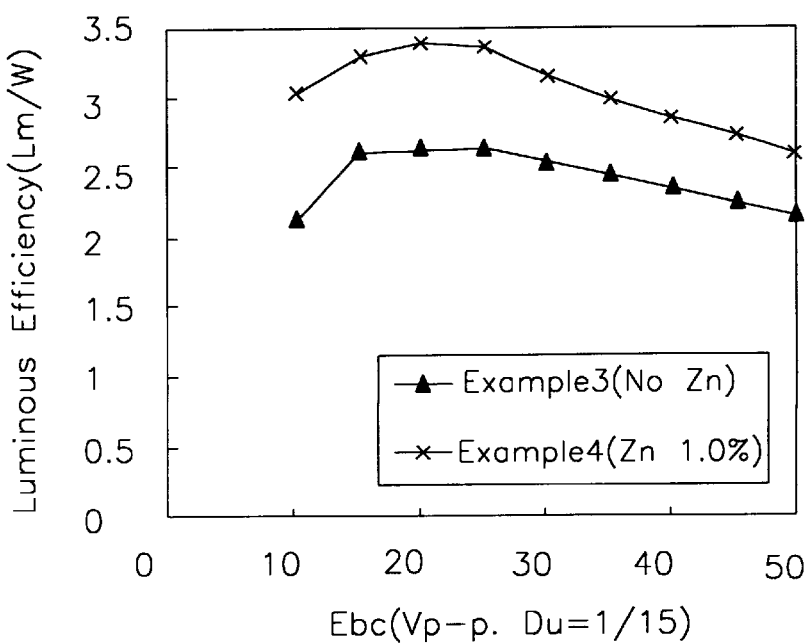
FIG. 5 is a graph showing luminous efficiencies of white phosphors according to embodiments of the present invention.

FIG. 5 shows the luminous efficiency changes of the white phosphor of Examples 3 and 4 according to the changes of Ebc at the duty ratio of 1/15. As shown in FIG. 5, the phosphor with Zn additive shows higher luminous efficiency than the phosphor with no Zn additive.

Figure 6:
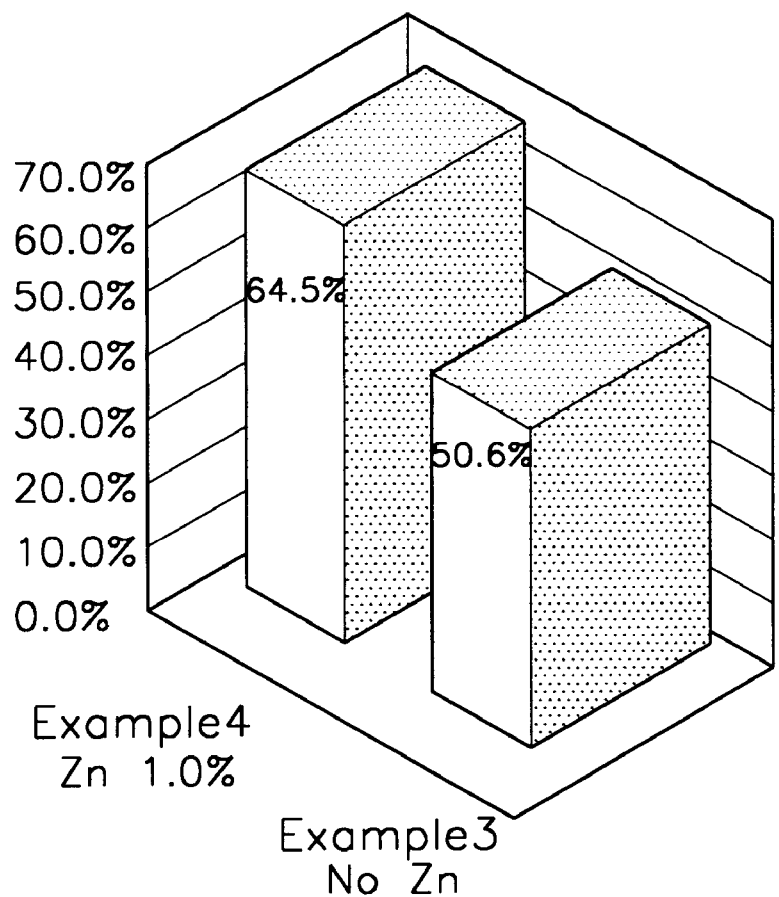
FIG. 6 is a graph showing changes of brightness of white phosphors according to embodiments of the present invention.

FIG. 6 is a graph showing the change of brightness of white phosphors according to a temperature change. As shown in FIG. 6, the brightness decreases as the temperature increases. However, when the temperature is raised from 25° C. to 85° C., the brightness of the phosphors of Examples 3 and 4 decreases to 50.6% and 64.5%, respectively, compared with the brightness of the phosphor at room temperature (25° C.). The reductions in brightness are less than the reduction of conventional phosphor, and the reduction can be minimized by adding Zn additive to the phosphor.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A low-voltage excited white phosphor comprising:
   a ZnS:Zn phosphor; and
   a $(Zn_nCd_{1-n})S:Ag,Cl$ phosphor, wherein n ranges from 0.5 to 0.7.

2. The low-voltage excited white phosphor of claim 1 wherein the weight ratio of the ZnS:Zn phosphor: the $(Zn_nCd_{1-n})S:Ag,Cl$ phosphor is 20:80 to 80:20.

3. The low-voltage excited white phosphor of claim 1 further comprising a Zn additive.

4. The low-voltage excited white phosphor of claim 3 wherein the amount of Zn additive is from 0.1 to 5.0 wt % of the white phosphor.

5. The low-voltage excited white phosphor of claim 3 wherein the Zn additive includes Zn particles having diameters of 0.1 to 10 $\mu$m and at least 95% purity.

6. The low-voltage excited white phosphor of claim 1 wherein the white phosphor has a color coordinate of x=0.20 to 0.45 and y=0.20 to 0.45 in a CIE chromaticity diagram.

7. The low-voltage excited white phosphor of claim 3 wherein the Zn additive comprises Zn particles having diameters of 0.1 to 100 micrometers.

* * * * *